United States Patent

Sonefors

[11] Patent Number: 5,361,665
[45] Date of Patent: Nov. 8, 1994

[54] SAW BLADE

[75] Inventor: Yngve Sonefors, Bollnäs, Sweden

[73] Assignee: Sandvik AB, Sandviken, Sweden

[21] Appl. No.: 58,670

[22] Filed: May 10, 1993

Related U.S. Application Data

[63] Continuation of Ser. No. 838,883, Feb. 21, 1992, abandoned.

[30] Foreign Application Priority Data

Sep. 6, 1990 [SE] Sweden ..................... 9002836-6

[51] Int. Cl.$^5$ ............................................. B27B 33/02
[52] U.S. Cl. ............................................. 83/848; 83/852
[58] Field of Search ............................. 83/835, 848–852

[56] References Cited

U.S. PATENT DOCUMENTS

| | | | |
|---|---|---|---|
| 73,226 | 1/1868 | Boynton. | |
| 82,289 | 9/1868 | Burgess | 83/850 |
| 542,420 | 7/1895 | Morris | 83/850 |
| 601,343 | 3/1898 | Johnson | 83/852 |
| 1,167,801 | 6/1914 | De Laney. | |
| 1,421,520 | 7/1922 | Mattson | 83/848 |
| 1,494,576 | 5/1924 | Biedermann et al. | 83/851 |
| 2,072,624 | 3/1937 | Owen. | |
| 3,374,815 | 3/1968 | Anderson, Jr. et al. | |
| 3,716,916 | 2/1973 | Alexander | 30/369 |
| 4,492,141 | 1/1985 | Takeuchi | 83/852 |
| 4,784,034 | 11/1988 | Stones et al. | 83/852 |
| 4,802,396 | 2/1989 | Kuklinski | 83/849 |

*Primary Examiner*—Eugenia Jones
*Attorney, Agent, or Firm*—Burns, Doane, Swecker & Mathis

[57] ABSTRACT

A saw blade comprises scratcher teeth which are not set, and shaving teeth which are set. All of the teeth have their leading and trailing lateral edges chamfered. The chamfering of successive teeth occurs at alternate sides of the blade. The scratcher teeth have sharp points, whereas the shaving teeth are truncated to form oblique top surfaces and to render the shaving teeth shorter than the scratcher teeth.

5 Claims, 1 Drawing Sheet

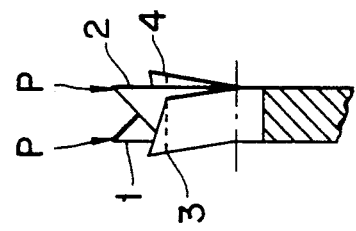
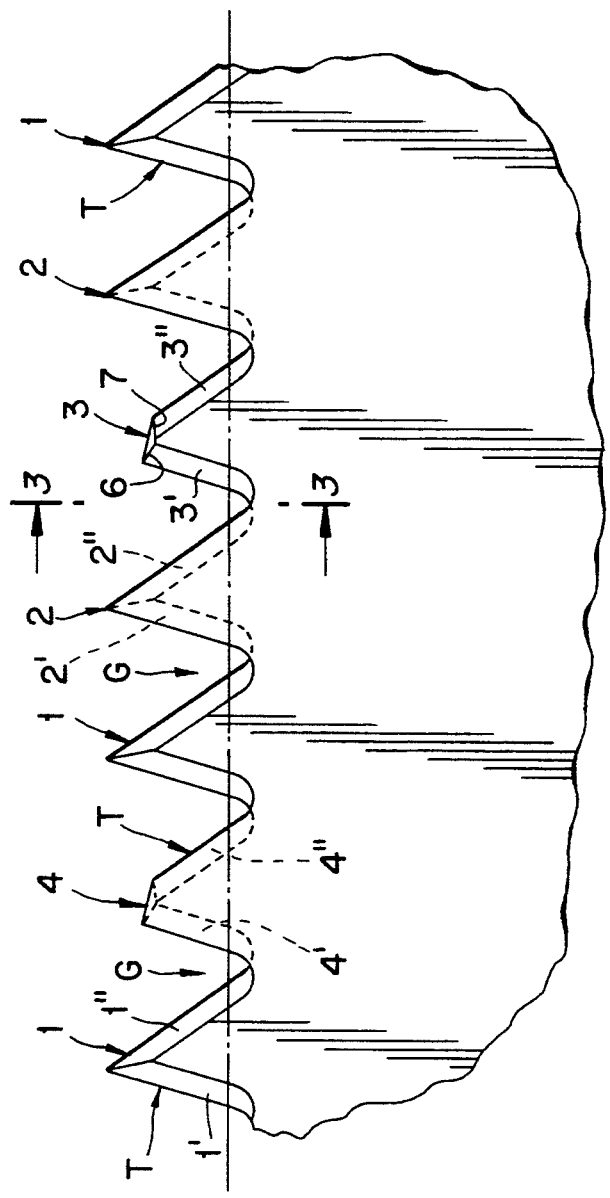
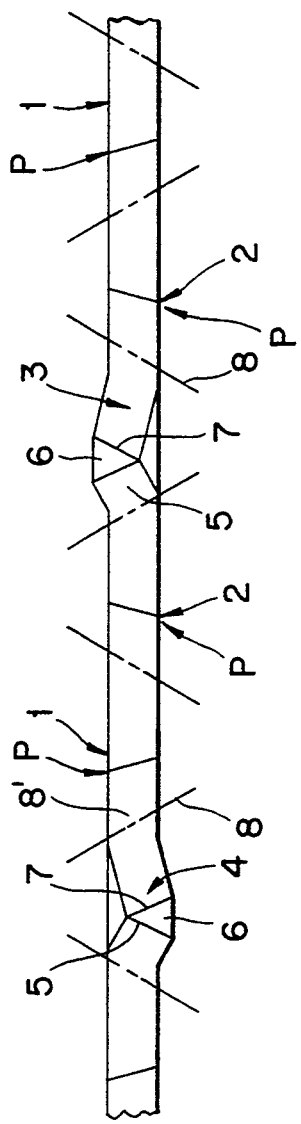

SAW BLADE

This application is a continuation of application Ser. No. 07/838,883, filed Feb. 21, 1992, now abandoned.

BACKGROUND OF THE INVENTION

Traditionally, handsaws for the rip-sawing of wood in the direction of the grain have been made with raker teeth having crosswise edges approximately perpendicular to the saw blade surfaces, at least before setting of the teeth. On the other hand, handsaws for the crosscutting of wood across the grain have been made with scratcher teeth having lateral edges formed by filed or ground bevels along the tooth contour and sharp points which sever the fibers like knife points.

For mixed use, i.e., for sawing of wood with variable grain direction and for sawing of plywood, particle board or similar sheet materials, both types of said teeth are inefficient.

Saw makers tried early to make saws for mixed use with alternating raker teeth and scratcher teeth, as shown in Boynton U.S. Pat. No. 73,226; Alexander U.S. Pat. No. 3,716,916; and Kuklinski U.S. Pat. No. 4,802,396, where the scratcher teeth are set so that their points create the sides of a kerf wider than the saw thickness. The raker teeth are straight and serve to transport the chips and to loosen lengthwise fibers from the kerf bottom. The scratcher teeth are somewhat higher than the raker teeth to ensure that during crosscutting, the fibers are severed before they are loosened by the raker teeth.

Other tried designs include saws with scratcher teeth of equal height but variable setting width so as to position the points in four rows, as disclosed in Stones et al U.S. Pat. No. 4,784,034. This was intended to make the chips, even in rip-sawing, small enough to be transported out from the kerf.

A type of tooth whose configuration lies somewhere between raker and scratcher teeth is the shaving tooth having a chamfered contour and a top surface which slants obliquely inwards and rearwards is known from Laney U.S. Pat. No. 1,167,801; Owen U.S Pat. No. 2,072,624; and Anderson, Jr. et al U.S. Pat. No. 3,374,815. That tooth is intended to be capable of producing a smooth kerf during the return stroke.

Experience shows that a saw blade for mixed use should have some scratcher teeth for acceptable work in cross-cutting. Scratcher teeth which are set to create the sides of the kerf are very easily damaged by nails or mineral grains. Since each scratcher tooth is self-feeding in the lateral direction, a straight cut requires symmetrical forces, whereby even small damage on one side of the tooth can cause the saw to make a crooked cut.

None of the above-mentioned tooth configurations will make an acceptable cut in an end grain surface. With each configuration it is difficult to start a new cut with precision, and to saw straight in knotty or uneven wood.

SUMMARY OF THE INVENTION

The present invention concerns a saw blade with a new combination of scratcher teeth and shaving teeth, which is less sensitive to tooth damage and which has vertical guiding surfaces to enable it to produce a straight cut from the beginning independent of the grain direction.

A saw blade for sawing wood, according to the present invention, has right and left sides and comprises scratcher teeth and shaving teeth. The scratcher teeth have narrow points and leading and trailing lateral edges. The edges of each scratcher tooth are chamfered on the same side of the blade. The scratcher teeth are not set. The shaving teeth have oblique top surfaces and leading and trailing lateral edges. The leading and trailing edges on each shaving tooth are chamfered on the same side of the blade. The shaving teeth are set alternately to the right and to the left and have a lesser height than the scratcher teeth. Successive teeth on the blade are separated by gullets and are chamfered alternately to opposite sides of the blade.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 1 is a side elevational view of a fragment of a blade according to the present invention;

FIG. 2 is a plan view of the blade fragment depicted in FIG. 1; and

FIG. 3 is a cross-sectional view taken along the line 3—3 in FIG. 1.

DETAILED DESCRIPTION OF A PREFERRED EMBODIMENT OF THE INVENTION

A saw blade according to the invention has teeth T along its toothline, and gullets G between the teeth. All teeth have chamfered leading and trailing lateral edges. Some of the teeth constitute scratcher teeth 1, 2 which are straight without being set. Each scratcher tooth includes leading and trailing lateral edges 1', 1" and 2', 2". Those lateral edges are defined by leading and trailing chamfer surfaces 10', 10" and 12', 12". The lateral edges of any given scratcher tooth are chamfered on the same side of the blade to form a sharp point P, the sharp points P being located alternatingly in the planes of the right and left hand surfaces of the blade. The other teeth of the blade constitute shaving teeth 3, 4 each having chamfered leading and trailing lateral edges 3', 3" and 4', 4". Those lateral edges are defined by leading and trailing chamfer surfaces 13', 13" and 14', 14". The lateral edges of any given shaving tooth are chamfered on the same side of the blade. Each shaving tooth is truncated by means of an oblique top surface 6 slanting rearwards with some chamfer in the same direction as the chamfer of the leading lateral edge. The top surface 6 has one trailing transversal edge 7 which is parallel to the axis 8 of the bottom 8' of the following gullet, and one leading transversal edge 5. The top surface 6 is higher at its leading end than at its trailing end, i.e., the vertical distance from the gullet bottom 8' to the leading transversal edge 5 is greater than to the trailing transversal edge 7. The shaving teeth 3, 4 are set alternatingly to the right and left by an amount less than the blade thickness.

The shaving teeth 3, 4 are not located adjacent to other shaving teeth, i.e., no shaving tooth immediately trails another shaving tooth. Between two successive shaving teeth 3, 4 are located an even number of scratcher teeth 1, 2, preferably two or four. This has the advantage that the toothline can be ground or milled in just two operations, with every second gullet formed in the first operation, and the remaining gullets formed in the second operation. The top surfaces 6 of the shaving teeth are formed in the same operation as the trailing gullet G. The lower parts of the shaving teeth 3, 4 are of the same shape as the scratcher teeth, i.e., the same front-to-rear distance, the same slope angle, and the same chamfer angle for the lateral edges. Hence, the provision of the top surface 6 on the shaving teeth ensures that the shaving teeth 3, 4 are shorter than the scratcher teeth 1, 2 even before being set.

The lateral edges of successive teeth on the blade are chamfered alternately to opposite sides of the blade. Thus, referring to FIG. 1, starting from the left end, the lateral edges 1' and 1" of the tooth 1 are chamfered toward the viewer; the lateral edges 4' and 4" of the next tooth 4 are chamfered away from the viewer; the lateral edges 1' and 1" of the next tooth 1 are chamfered toward the viewer; and so on.

One advantage with a saw blade according to the invention is that the scratcher teeth 1, 2 by virtue of their position in the middle of the kerf are less vulnerable to damage of their narrow points due to nails or abrasive particles. This is especially favorable for saws with hardened teeth, since they cannot be easily resharpened with a file. The shaving teeth 3, 4 have broader points which are less sensitive.

Another major advantage is that since the scratcher teeth 1, 2 are not set, the parts of the lateral surfaces of the saw blade extending to the points of the scratcher teeth 1, 2 will function as vertical guiding surfaces and help the saw make a straight cut in uneven material.

A third advantage is that the slanting top surface 6 of the shaving teeth 3, 4 will steady the saw during a reverse stroke which is the normal way to start a new cut. There is then less risk of damaging the wood surface, and easier to locate the cut with desired precision. This is especially noticeable in end grain, where all previous saws cause problems.

A fourth advantage is that a saw blade according to the invention in mixed use is more efficient than any saw blade with scratcher teeth only, and easier to manufacture than any saw blade carrying a mixture of scratcher and raker teeth.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Saw blade for sawing wood, said blade having right and left sides and comprising:

a plurality of teeth consisting of scratcher teeth and shaving teeth, said scratcher teeth arranged in groups, each group comprising an even number of scratcher teeth, each scratcher tooth having a narrow point and leading and trailing lateral edges defined, respectively, by leading and trailing chamfer surfaces which converge toward a side of the blade to form said point, said leading and trailing chamfer surfaces of a given scratcher tooth being chamfered on the same side of the blade, some of said scratcher teeth being chamfered on the left side, others of said scratcher teeth being chamfered on the right side, whereby some of said points are disposed at said left side, and others of said points are disposed at said right side, said scratcher teeth not being set and being of equal height, said shaving teeth each having leading and trailing lateral edges defined, respectively, by leading and trailing chamfer surfaces which converge toward a side of the blade, said leading and trailing chamfer surfaces of a given shaving tooth being chamfered on the same side of the blade, some of said shaving teeth being chamfered on the left side, others of said shaving teeth being chamfered on the right side, each shaving tooth being truncated to form an oblique top surface intersecting said leading and trailing chamfer surfaces, said shaving teeth being set alternately to the right side and to the left side and being of equal height and shorter than said scratcher teeth, successive ones of said teeth being separated by gullets and being chamfered alternately on opposite sides of the blade, said groups of scratcher teeth being separated by a single one of said shaving teeth, the total number of said shaving teeth amounting to no more than substantially one third of the total number of teeth of said saw blade.

2. Saw blade according to claim 1, wherein said shaving teeth are set by an amount less than the thickness of the blade.

3. Saw blade according to claim 1, wherein each said group comprises two scratcher teeth.

4. Saw blade according to claim 1, wherein said top surface of each of said shaving teeth includes leading and trailing transverse edges, said trailing transverse edge being parallel to the bottom of the following gullet.

5. Saw blade according to claim 1, wherein said top surface of each shaving tooth is higher at an end thereof facing a forward end of the blade than at an end thereof facing a rearward end of the blade.

* * * * *